Feb. 14, 1967   N. L. DOOTSON   3,303,973
CHEF'S SALT SHAKER
Filed May 27, 1966
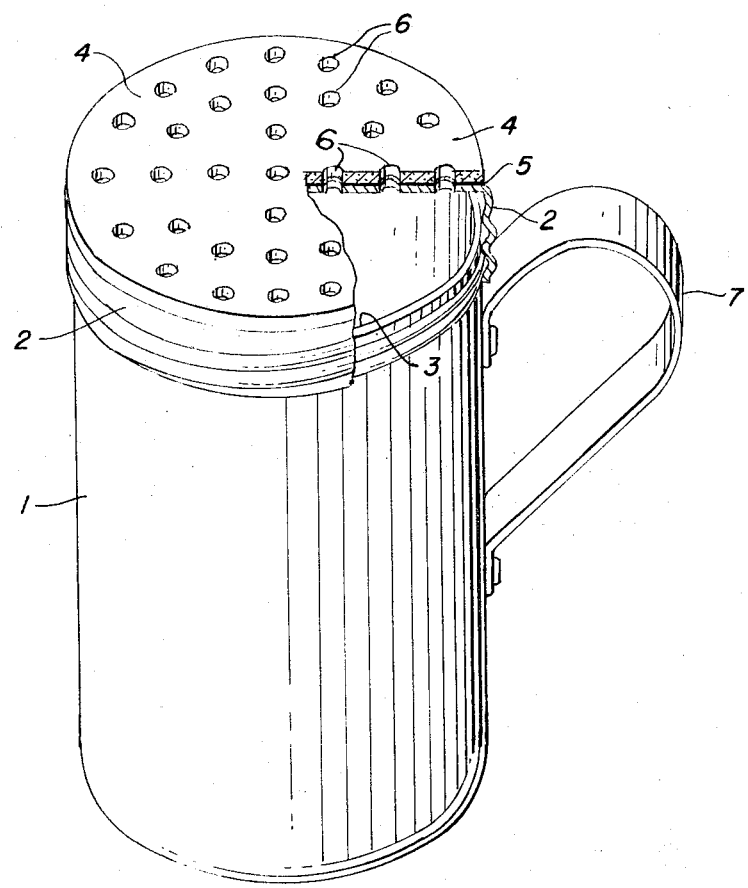
INVENTOR
NORMAN L. DOOTSON
Norman L. Dootson 3,303,973
Patented Feb. 14, 1967

3,303,973
CHEF'S SALT SHAKER
Norman L. Deotson, San Francisco, Calif., assignor to Winifred M. Colombo, Mill Valley, Calif.
Filed May 27, 1966, Ser. No. 553,539
4 Claims. (Cl. 222—190)

The present invention relates to a non-clogging salt shaker for use in the kitchen or barbecue pit over steaming hot foods and liquids.

Heretofore there have been salt shakers with moisture absorbent material lining the walls or bottom within the dispenser or lining the under side of the cap within the dispenser. Some others have had a thick cap of moisture absorbent mineral material perforated by one or two relatively deep sprinkle holes for the purpose of absorbing moisture from the salt within the dispenser and also as it passes through these deep pouring holes.

My invention is designed primarily to provide a chef's or kitchen salt shaker with a novel and practical sprinkler top adapted to absorb and quickly dissipate the steam arising from hot steaming foods and liquids. Normally the steam condenses and collects on the shaker top and around the upper part of the sprinkle holes, and when the dispenser is used again and again before the outer top surface and holes dry out, the salt has a tendency to stick and in time clog the holes. In order to overcome this condensing of the steam and resultant hole-clogging I provide a thin outer layer or coating of moisture absorbent fine grained cellulose sponge cloth cemented or otherwise bonded to the outside upper surface of the shaker top, with matching sprinkler holes for the sponge and the top. For best results I find that the moisture absorbent outer layer must have a moisture resistant bottom and the sprinkler holes should be relatively shallow. Since the layer of sponge is bonded to the top surface of the metal sprinkler cap it is apparent that the metal cap comes between the layer of sponge and the salt within the shaker at all times, thus providing a moisture resistant barrier between the layer of sponge and the salt in the container, and this fact prevents any of the steaming moisture which is absorbed by the sponge cloth from being in turn absorbed by the salt in the container.

My invention is described in the accompanying over-sized perspective drawing (partially in section), in which a salt dispenser can 1, of thin aluminum or other thin metal or plastic, is threaded adjacent its neck 3 to accommodate a non-moisture absorbent sprinkler cap 2. A thin layer or coating of a fine-grained moisture absorbent cellulose sponge cloth 4 is cemented or otherwise bonded to the top surface of sprinkler cap 2 as at 5. Cap 2 and sponge layer 4 are provided with matching sprinkle holes 6, and can 1 preferably has a handle 7.

Of course it is obvious that this novel salt sprinkler cap improvement can be applied to the on-off sprinkler-or-pour turn tops now in use on some cartons of salt.

Having thus described my invention what I claim is:

1. A chef's salt shaker comprising a container for the salt, and a perforated sprinkler cap of a non-moisture absorbent material on said container, and including an outer layer of a readily moisture absorbent material provided with a plurality of matching sprinkler perforations of substantially the same size as the perforations of said cap.

2. In the construction as set out in claim 1, said sprinkler cap and said moisture absorbent outer layer being relatively thin providing shallow through sprinkle holes.

3. In the construction as set out in claim 1, said sprinkler cap and said moisture absorbent layer bonded together with their sprinkler holes aligned.

4. In the construction as set out in claim 1, said moisture absorbent layer being constructed of a fine grained cellulose sponge cloth, perforated with the sprinkler holes.

References Cited by the Examiner
UNITED STATES PATENTS 2,105,621   1/1938   Testi _____ 222—565 X
2,644,616   7/1953   Gordon _____ 222—190 X ROBERT B. REEVES, *Primary Examiner.*

HADD S. LANE, *Examiner.*